United States Patent Office 3,301,867
Patented Jan. 31, 1967

3,301,867
NOVEL PYRIDOINDOLES
Jacob Szmuszkovicz, Kalamazoo, Mich., assignor to The Upjohn Company, Kalamazoo, Mich., a corporation of Delaware
No Drawing. Filed Nov. 6, 1963, Ser. No. 321,661
2 Claims. (Cl. 260—296)

This invention relates to novel indole derivatives and acid addition salts thereof.

The compounds of this invention include 1-styryl- and 1-phenethyl-6-methoxy-9H-pyrido[3,4-b]indoles of the formula

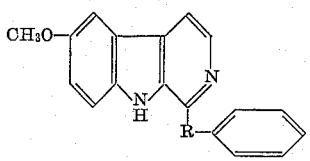

wherein R is vinylene or ethylene, and the physiologically acceptable acid addition salts thereof, such as the hydrochloride, hydrobromide, acetate, pyruvate, sulfate, phosphate, citrate, tartrate, salicylate, lactate, succinate benzoate, nitrate, p-toluenesulfonate and the like.

The products of this invention are named in accord with the basic structure having positions numbered as follows:

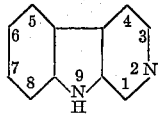

The compounds of this invention, particularly the 1-phenethyl derivatives, demonstrate significant depressant activity and can be administered to humans and animals as the primary active ingredient of conventional pharmaceutical forms such as tablets, capsules, elixirs, injectable solutions and suspensions and the like for tranquilization. These compounds are also active as anti-parasitic, anti-inflammatory, anorexigenic and analgesic agents. Additionally, the free bases form salts with fluosilicic acid which are useful as mothproofing agents in accord with U.S. Patent 1,915,334 and 2,075,359. The free bases also form salts with thiocyanic acid which condense with formaldehyde to form resinous materials useful as pickling inhibitors according to U.S. Patents 2,425,320 and 2,606,155.

In preparing the products of this invention the known 1-methyl-6-methoxy-9H-pyrido[3,4-b]indole is reacted with benzaldehyde to yield the intermediate 1-styryl-6-methoxy-9H-pyrido[3,4-b]indole. Hydrogenation of this product gives the desired 1-phenethyl-6-methoxy-9H-pyrido[3,4-b]indole, which on conventional treatment with hydrogen chloride or other suitable acids produces the corresponding hydrochloride or other acid addition salts. Purification is by conventional procedures.

The following examples illustrate the synthesis of representative products of this invention but are not to be construed as limiting the scope thereof.

EXAMPLE 1

1-styryl-6-methoxy-9H-pyrido[3,4-b]indole

A solution of 1-methyl-6-methoxy-9H-pyrido[3,4-b]indole (14.6 gm., 0.069 mole) in 69 ml. of benzaldehyde was refluxed under nitrogen for 4 hours with an azeotropic separator. It was then cooled to room temperature, 500 ml. of ether was added followed by 10% aqueous hydrochloric acid until precipitation of the hydrochloride was complete. The solid was filtered, washed with ether and suspended in 190 ml. of 95% ethanol. Dilute ammonium hydroxide (125 ml. of 6%) was added and the resulting free base was filtered and washed with water. Crystallization from methanol afforded 17.8 gm. (86% yield) of product as yellow prisms melting at 167–169° C., unchanged on recrystallization. Ultraviolet spectrum (ethanol) showed λmax. 220 (31,800); 250 (24,650); sh. 262 (18,950); 323 (26,350); 398 (11,050). Infrared spectrum (mineral oil mull) showed NH: 3610, 3240, 3160; =CH: 3060, 3020; C=C/C=N: 1643, 1635, 1601, 1580, 1565, 1495.

Analysis.—Calcd. for $C_{20}H_{16}N_2O \cdot \frac{1}{4}CH_3OH$: C, 78.87; H, 5.56; N, 9.09. Found: C, 78.79; H, 5.42; N, 9.13.

EXAMPLE 2

1-phenethyl-6-methoxy-9H-pyrido[3,4-b]indole

A solution of the benzylidene product of Example 1 (5.1 gm., 0.017 mole) in 300 ml. of absolute ethanol was hydrogenated at 50 p.s.i. initial pressure of hydrogen in the presence of 1 gm. of 10% palladium-on-carbon catalyst. After 20 minutes the mixture was filtered and evaporated to dryness to give 5 gm. of 1-phenethyl-6-methoxy-9H-pyrido[3,4-b]indole.

EXAMPLE 3

1-phenethyl-6-methoxy-9H-pyrido[3,4-b]indole hydrochloride

The product of Example 2 was dissolved in ether and converted to the hydrochloride with ethereal hydrogen chloride; 4.9 gm. (85% yield), M.P. 258–259° C. (dec.). Crystallization from methanol-ether afforded yellow rods, M.P. 258.5–259.5° C. Ultraviolet spectrum (ethanol) showed λmax. 234 (26,150); 261 (20,750); 297 (16,750); 309 (18,450); sh. 376 (3,150); 400 (3,850). Infrared spectrum (mineral oil mull) showed =CH: 3030, 3000; salt: 2620; C=N/C=C: 1645, 1632, 1617, 1580, 1538, 1500.

Analysis.—Calcd. for $C_{20}H_{19}N_2OCl$: C, 70.89; H, 5.65; N, 8.27; Cl, 10.46. Found: C, 71.00; H, 5.56; N, 7.96; Cl, 10.45.

Conventional treatment of the free bases of Examples 1 and 2 with an acid such as hydrochloric, hydrobromic, acetic, pyruvic, sulfuric, phosphoric, citric, tartaric, salicyclic, lactic, succinic, benzoic, nitric p-toluenesulfonic and the like followed by purification in the usual manner, gives the corresponding acid addition salt.

What is claimed is:
1. 1-phenethyl-6-methoxy-9H-pyrido[3,4-b]indole.
2. 1 - phenethyl-6-methoxy-9H-pyrido[3,4-b]indole hydrochloride.

References Cited by the Examiner

Beilstein's Handbuch der Organischen Chemie, 4th ed., vol. 23 (Erstes Erganzungswerk), pages 141 to 142 (system No. 3516), Von Springer, Berlin, Germany (1936).

Beilstein's Handbuch der Organischen Chemie, 4th ed., vol. 23 (Zweites Erganzungswerk), page 380 (system No. 3517), Von Springer, Berlin, Germany (1954).

JOHN D. RANDOLPH, *Primary Examiner.*